(12) United States Patent
Pinero et al.

(10) Patent No.: US 8,434,997 B2
(45) Date of Patent: May 7, 2013

(54) GAS TURBINE ENGINE CASE FOR CLEARANCE CONTROL

(75) Inventors: Hector M. Pinero, Middletown, CT (US); George N. Peroulakis, West Suffield, CT (US)

(73) Assignee: United Technologies Corporation, Hartford, CT (US)

( * ) Notice: Subject to any disclaimer, the term of this patent is extended or adjusted under 35 U.S.C. 154(b) by 1152 days.

(21) Appl. No.: 11/843,112

(22) Filed: Aug. 22, 2007

(65) Prior Publication Data

US 2009/0053041 A1 Feb. 26, 2009

(51) Int. Cl.
*F03B 11/02* (2006.01)
(52) U.S. Cl.
USPC .......................................................... 415/115
(58) Field of Classification Search ............ 415/17, 415/47, 115, 174.1, 220
See application file for complete search history.

(56) References Cited

U.S. PATENT DOCUMENTS

| | | | |
|---|---|---|---|
| 3,227,418 A | 1/1966 | West | |
| 4,329,114 A * | 5/1982 | Johnston et al. | 415/145 |
| 4,338,061 A * | 7/1982 | Beitler et al. | 415/1 |
| 4,363,599 A * | 12/1982 | Cline et al. | 415/136 |
| 4,525,998 A * | 7/1985 | Schwarz | 60/226.1 |
| 4,550,562 A | 11/1985 | Rice | |
| 4,762,462 A | 8/1988 | Lardellier | |
| 4,999,991 A | 3/1991 | Haddad et al. | |
| 5,049,033 A | 9/1991 | Corsmeier et al. | |
| 5,212,940 A * | 5/1993 | Glover | 60/782 |
| 5,219,268 A | 6/1993 | Johnson | |
| 5,545,007 A | 8/1996 | Martin | |
| 6,185,925 B1 * | 2/2001 | Proctor et al. | 60/806 |
| 6,626,635 B1 | 9/2003 | Prowse et al. | |
| 6,913,064 B2 | 7/2005 | Beals et al. | |
| 6,951,239 B1 | 10/2005 | Snyder et al. | |
| 6,976,824 B2 | 12/2005 | Nottin | |
| 6,997,673 B2 | 2/2006 | Morris et al. | |
| 7,079,957 B2 | 7/2006 | Finnigan et al. | |
| 7,090,224 B2 | 8/2006 | Iguchi et al. | |
| 7,090,466 B2 | 8/2006 | Honkomp et al. | |
| 7,134,475 B2 | 11/2006 | Snyder et al. | |
| 7,172,012 B1 | 2/2007 | Memmen | |
| 7,174,945 B2 | 2/2007 | Beals et al. | |
| 7,175,385 B2 | 2/2007 | Aschenbruck et al. | |
| 7,191,598 B2 | 3/2007 | Coleman et al. | |
| 7,195,452 B2 | 3/2007 | Allan et al. | |
| 7,195,453 B2 | 3/2007 | Martin et al. | |
| 7,434,402 B2 * | 10/2008 | Paprotna et al. | 60/772 |

(Continued)

FOREIGN PATENT DOCUMENTS

| | | |
|---|---|---|
| GB | 2 183 296 | 6/1987 |
| WO | 92/17686 | 10/1992 |

OTHER PUBLICATIONS

European Search Report for EP Application No. 08252759.9, Mar. 15, 2012.

*Primary Examiner* — Edward Look
*Assistant Examiner* — Aaron R Eastman
(74) *Attorney, Agent, or Firm* — Carlson, Gaskey & Olds, P.C.

(57) ABSTRACT

A gas turbine engine includes an active clearance control (ACC) system within the engine casing. The case includes a wall structure with a cast-in cooling configuration through Refractory Metal Core technology which is tailored to address traditional hot spots and improve discrete control of case growth.

15 Claims, 4 Drawing Sheets

U.S. PATENT DOCUMENTS

| | | | |
|---|---|---|---|
| 7,491,029 B2* | 2/2009 | Pezzetti, Jr. et al. | 415/1 |
| 7,503,179 B2* | 3/2009 | Estridge et al. | 60/782 |
| 7,665,310 B2* | 2/2010 | Laborie | 60/806 |
| 2002/0136631 A1* | 9/2002 | Zearbaugh et al. | 415/116 |
| 2004/0219011 A1* | 11/2004 | Albers et al. | 415/174.2 |
| 2006/0118262 A1* | 6/2006 | Beals et al. | 164/35 |
| 2006/0225430 A1* | 10/2006 | Paprotna et al. | 60/782 |
| 2007/0086887 A1* | 4/2007 | Pezzetti et al. | 415/173.1 |
| 2007/0128016 A1* | 6/2007 | Dasgupta et al. | 415/14 |
| 2007/0140838 A1* | 6/2007 | Estridge et al. | 415/178 |
| 2007/0140839 A1* | 6/2007 | Bucaro et al. | 415/178 |

\* cited by examiner

GAS TURBINE ENGINE CASE FOR CLEARANCE CONTROL

BACKGROUND OF THE INVENTION

The present invention relates to tip clearance control, and more particularly to a cored case structure for active tip clearance control in a gas turbine engine.

Gas turbine engine rotor blade tip clearances have a significant influence on engine performance. When clearance between blade tip and case is controlled, leakage past the blade tips is minimized for efficient cruise flight, yet clearance can be selectively increased during other portions of the flight so as to avoid blade tip rub. Thrust specific fuel consumption of the engine is thereby reduced and engine durability is increased.

Systems that control blade clearance are typically referred to as active clearance control (ACC) systems. Active clearance control systems cool certain areas of the engine case to shrink the engine case around the rotating compressor blades to thereby minimize the clearance between the case and blade tips. One conventional method for ACC utilizes ducts external to the engine case which impinge relatively cool air on case rails which project from the gas turbine engine turbine case. The relatively cool fan air may be scooped from the fan stream or secondary flow and communicated through the ducts.

Although effective, the external ACC ducts and case rails may increase weight and complexity of the engine.

Accordingly, it is desirable to provide an uncomplicated and light weight active clearance control cooling system.

SUMMARY OF THE INVENTION

The gas turbine engine according to the present invention includes an active clearance control (ACC) system formed within the engine case. The engine case includes a wall structure with a cast-in cooling configuration tailored to address traditional hot spots and improve discrete control of the engine case. The ACC system also addresses instances of low supply pressure by the more refined enclosed environment which also reduces overall engine weight.

The present invention therefore provides an uncomplicated and light weight active clearance control system.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1A:
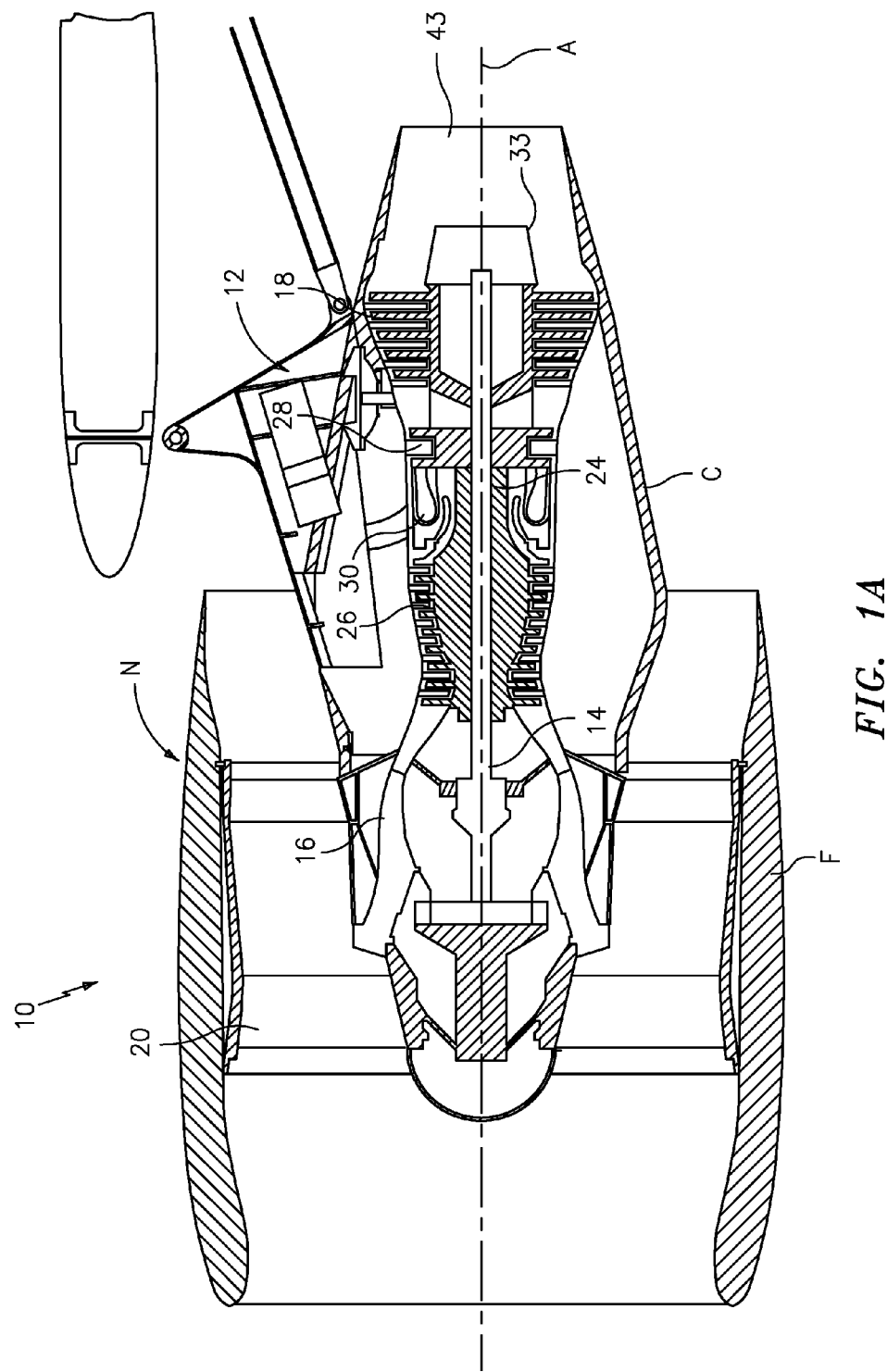
FIG. 1A is a general sectional view through a gas turbine engine along the engine longitudinal axis.

FIG. 1A illustrates a general partial fragmentary schematic view of a gas turbofan engine 10 suspended from an engine pylon 12 within an engine nacelle assembly N. FIG. 1 schematically illustrates a gas turbine 10 in the form of a jet engine. It is understood that embodiments of the invention may be utilized with a variety of turbines (e.g., power generation turbines) and is not limited to jet engine.

The turbofan engine 10 includes a core engine within a core nacelle C that houses a low spool 14 and high spool 24. The low spool 14 includes a low pressure compressor 16 and low pressure turbine 18. The low spool 14 drives a fan section 20 connected to the low spool 14 either directly or through a gear train.

The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

Airflow enters the fan nacelle F which at least partially surrounds the core nacelle C. The fan section 20 communicates airflow into the core nacelle C to the low pressure compressor 16. Core airflow compressed by the low pressure compressor 16 and the high pressure compressor 26 is mixed with the fuel in the combustor 30 where is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. A core engine exhaust exits the core nacelle C through a core nozzle 43 defined between the core nacelle C and a tail cone 33.

Figure 1B:
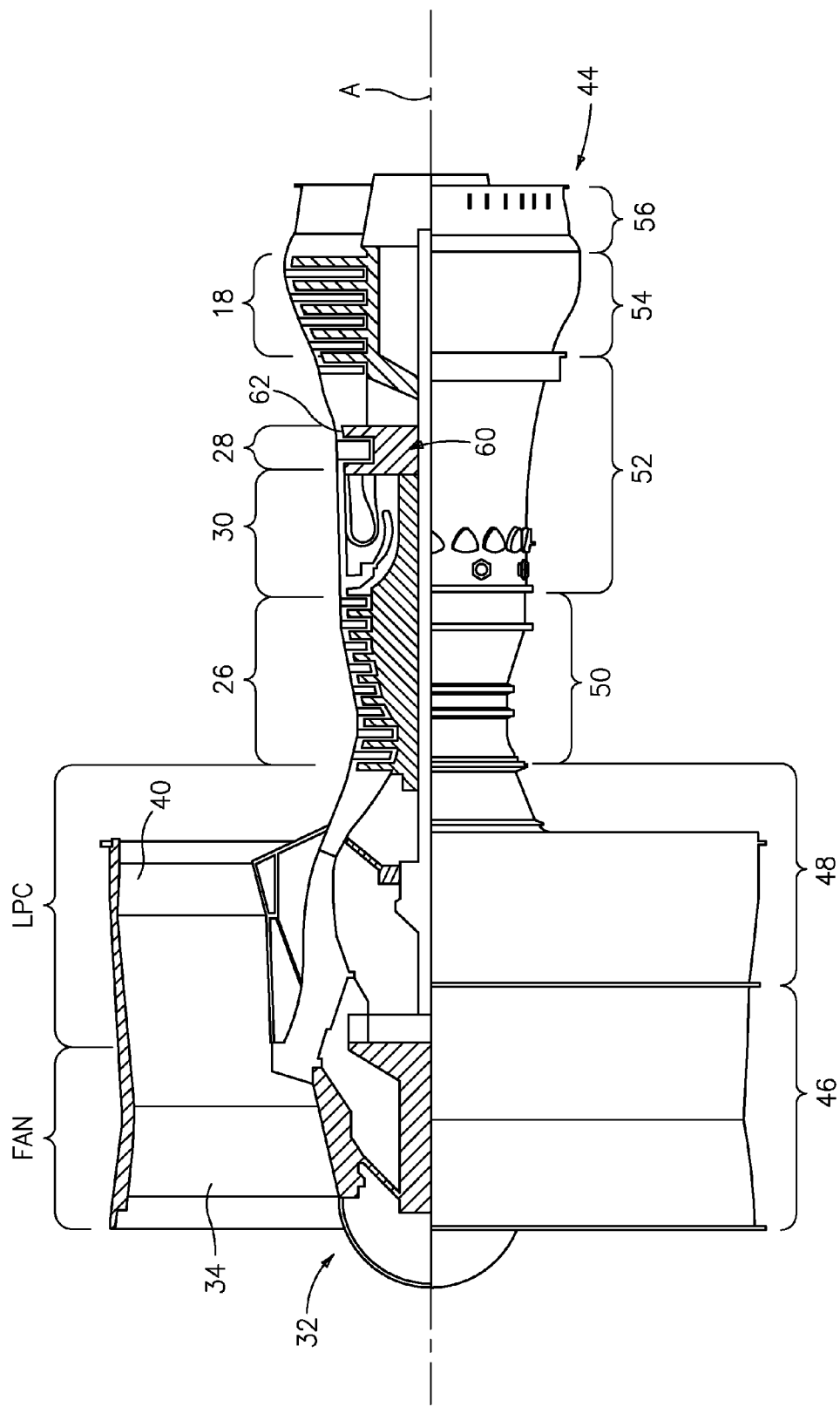
FIG. 1B is a general sectional view through a gas turbine engine along the engine longitudinal axis illustrating an engine static structure case arrangement on the lower half thereof.

Referring to FIG. 1B, the engine static structure 44 generally includes a case structure often referred to as the engine backbone. The engine static structure 44 includes a fan case 46, an intermediate case (IMC) 48, a high pressure compressor case 50, a high pressure turbine case 52, a low pressure turbine case 54, and an exhaust case 56.

The fan section 20 includes a fan rotor 32 with a plurality of circumferentially spaced radially outwardly extending fan blades 34. The fan blades 34 are surrounded by the fan case 46. The core engine case structure is secured to the fan case 46 at the IMC 48 which includes a multiple of circumferentially spaced radially extending struts 40 which radially span the core engine case structure and the fan section 20.

The high pressure turbine 28 includes a turbine rotor 60 with a plurality of circumferentially spaced radially outwardly extending turbine blades 62. The turbine blades 62 are surrounded by the high pressure turbine case 52.

Figure 2:
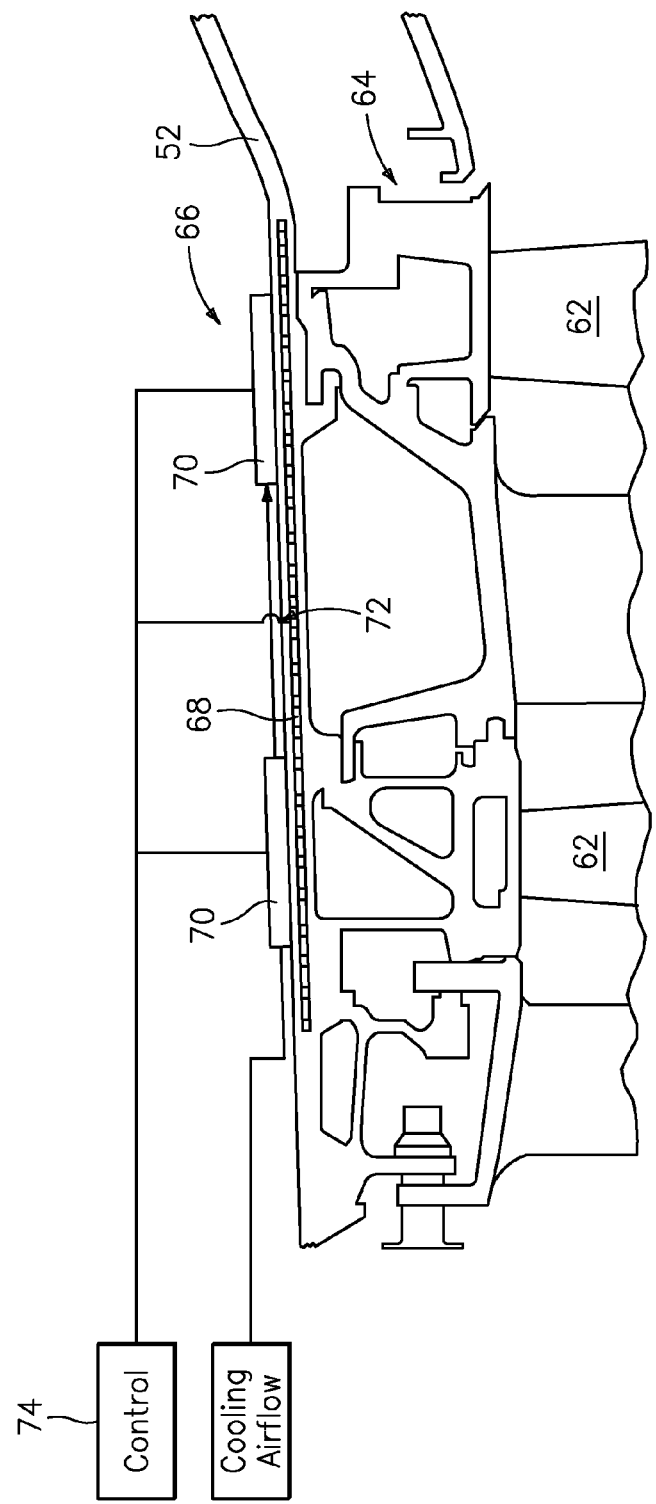
FIG. 2 is a schematic view of an ACC system.

Referring to FIG. 2, the turbine blades 62 rotate within a shroud structure 64 which is supported within the high pressure turbine case 52. The shroud structure 64 is typically circumferentially segmented and is mounted to the high pressure turbine case 52. The spacing between the tip of the turbine blades 62 and the shroud structure 64 is controlled through an active clearance control (ACC) system 66 formed directly into the high pressure turbine case 52. It should be understood that the disclosed embodiment is illustrated within the high pressure turbine case 52, however other cases including, for example, the fan case 46, an intermediate case (IMC) 48, a high pressure compressor case 50, a low pressure turbine case 54, and an exhaust case 56 will also benefit from the ACC system 66.

The high pressure turbine case 52 may be manufactured of a Cast Nickel Alloy that includes internal cooling passages 68 which are formed directly therein through a casting system, such as a refractory metal core technology. Refractory metal core technology allows for innovative processing of intricate geometries as well as positioning and wall thickness control. For further understanding of other aspects of Refractory Metal Core technology, attention is directed to U. S. Pat. No.

7,174,945 which is assigned to the assignee of the instant invention and which is hereby incorporated by reference herein in its entirety.

The ACC system 66 provides for a case density reduction and removal of conventional engine case rails typically required with external ACC tube structures. The internal cooling passages 68 mitigate low fan pressure issues and directs cooling to discrete case areas where cooling may be more beneficially utilized to provide a more efficient ACC system 66.

A supply manifold 70 is generally located adjacent the interval cooling passages 68 to distribute cooling airflow thereto from a source such as a fan or compressor section. One or more sensors 72 monitor parameters such as temperature, pressure, etc. associated with the HPT or any other section of the engine 10. The sensors 72 generate sensor signals that are provided to a controller 74 such as a FADEC. The sensor signals allow the controller 74 to adjust tip clearance in response to short-term takeoff-cruise-landing conditions, as well as long term deterioration by control of cooling airflow from the supply manifold 70 to the internal cooling passages 68. ACC may also operate during climb and cruise when the blade tip clearances of the mid and rear stages of the high pressure compressor are reduced to optimum value.

Figure 3:
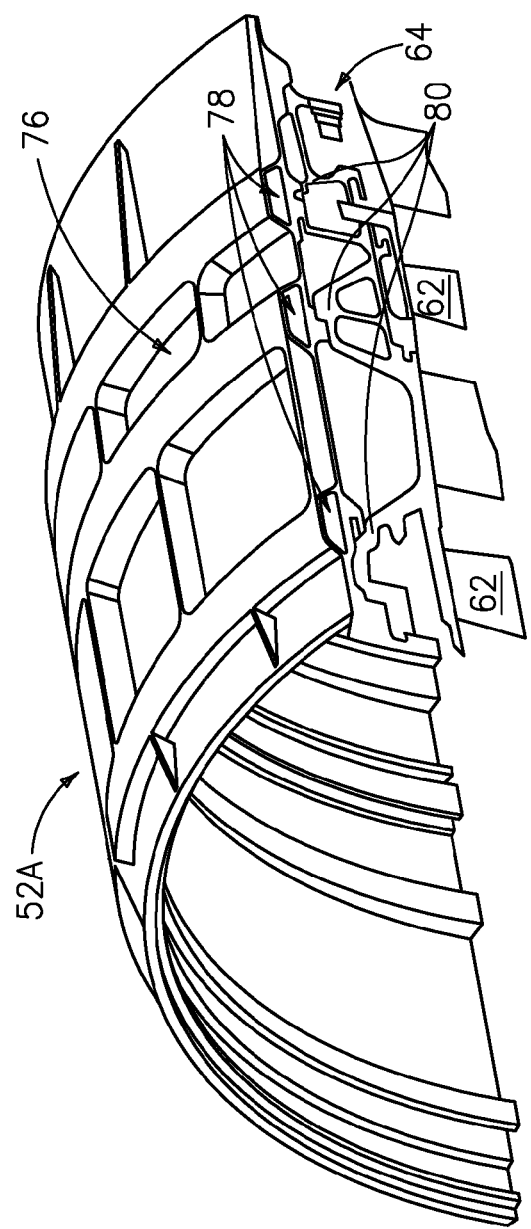
FIG. 3 is a schematic view of another ACC system.

Referring to FIG. 3, another high pressure turbine case 52A includes a duct structure 76 located circumferentially around the high pressure turbine case 52A. The duct structure 76 includes discrete ducts 78 which may be located directly outboard of an interface 80 between the shroud structure 64 and the high pressure turbine case 52A. That is, the ducts 78 are located directly adjacent the interface between the shroud structure 64 and the case 52A to thereby provide a more direct thermal transfer. The ducts 78 may extend outward from the high pressure turbine case 52A to provide a cooling flow path as well as increase rigidity of the case itself.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An active clearance control (ACC) system for a gas turbine engine comprising:
    an engine case provided by a wall with a wall thickness, and at least one internal cooling passage formed within the wall; and
    wherein the wall includes spaced apart inner and outer surfaces defining the wall thickness, and the wall includes a circumferential rib protruding from the outer surface radially outward as compared to axial adjacent outer surfaces, the internal cooling passage contained within the circumferential rib between the inner and outer surfaces.

2. The system as recited in claim 1, wherein said engine case is a high pressure turbine case.

3. The system as recited in claim 1, wherein said engine case is a low pressure turbine case.

4. The system as recited in claim 1, further comprising a supply manifold in communication with said at least one internal cooling passage.

5. The system as recited in claim 4, wherein said supply manifold is mounted on the outer surface of said engine case.

6. The system as recited in claim 5, further comprising a shroud structure at least partially supported by said inner surface of the engine case.

7. The system as recited in claim 6, further comprising a rotor with a plurality of circumferentially spaced radially outwardly extending blades directly adjacent to said shroud structure to define a tip clearance.

8. The system as recited in claim 1, further comprising a shroud structure supported by said engine case.

9. The system as recited in claim 8, further comprising a rotor with a plurality of circumferentially spaced radially outwardly extending blades directly adjacent to said shroud structure to define a tip clearance.

10. The system as recited in claim 1, wherein the wall is a unitary, cast structure, and the internal cooling passage is a cast passage within the wall provided between inner and outer surfaces defining the wall.

11. A gas turbine engine comprising:
    an engine case having at least one internal cooling passage formed therein, said engine case having a wall with a wall thickness, said wall thickness being defined by spaced apart inner and outer surfaces,
    a shroud structure supported by said engine case;
    a rotor with a plurality of circumferentially spaced radially outwardly extending blades directly adjacent to said shroud structure to define a tip clearance, a cooling airflow communicated into said at least one internal cooling passage operable to change said tip clearance; and
    wherein the wall includes a circumferential rib protruding from the outer surface radially outward as compared to axial adjacent outer surfaces, the internal cooling passage contained within the circumferential rib between the inner and outer surfaces.

12. The system as recited in claim 11, further comprising a supply manifold in communication with said at least one internal cooling passage.

13. The system as recited in claim 12, wherein said supply manifold is mounted on an outer surface of said engine case.

14. The system as recited in claim 11, wherein said at least one internal cooling passage is formed within a unitary, cast wall providing the engine case by a refractory metal core casting process.

15. The system as recited in claim 11, wherein said engine case at least partially forms said shroud structure.

* * * * *